United States Patent [19]

Lermite et al.

[11] Patent Number: 5,510,567
[45] Date of Patent: Apr. 23, 1996

[54] METHOD OF SEPARATING A MIXTURE OF GASES BY ABSORPTION

[75] Inventors: Christophe Lermite, Paris; Joseph Larue, Chambourcy; Alexandre Rojey, Rueil Malmaison, all of France

[73] Assignee: Institut Francais Du Petrole, Rueil Malmaison, France

[21] Appl. No.: 203,736

[22] Filed: Feb. 28, 1994

Related U.S. Application Data

[63] Continuation of Ser. No. 925,699, Aug. 7, 1992, abandoned.

[30] Foreign Application Priority Data

Aug. 8, 1991 [FR] France ...................... 9110229

[51] Int. Cl.[6] ........................................ C07C 7/10
[52] U.S. Cl. .................. 585/833; 585/921; 95/149; 95/187; 95/198; 95/209
[58] Field of Search .................... 585/833, 921; 95/149, 187, 198, 209

[56] References Cited

U.S. PATENT DOCUMENTS 4,149,857  4/1979  Volke et al. ........................... 55/40
4,979,966  12/1990  Rojey et al. .......................... 55/32

FOREIGN PATENT DOCUMENTS 0207199  1/1987  European Pat. Off. .
0362023  4/1990  European Pat. Off. .
2479701  10/1981  France .

*Primary Examiner*—Anthony McFarlane
*Assistant Examiner*—Nhat D. Phan
*Attorney, Agent, or Firm*—Millen, White, Zelano & Branigan

[57] ABSTRACT

A method of separating a mixture of gases by the following stages:
  a) absorbing a part G2 of a gas mixture G1 by a solvent L1 in an absorption zone C1;
  b) expanding the solvent L1, leading to partial vaporization of the absorbed gases G2 and cooling of the solvent L1;
  c) desorbing the gas fraction G2 in a desorption apparatus D1 having a reboiling zone B1 and an internal heat exchange zone Z1, wherein the solvent L1 from stage (b) is circulated in countercurrent contact with the vapor phase, and simultaneously has counter-current heat exchange with the solvent phase from the reboiling zone B1;
  d) passing the regenerated solvent leaving the reboiling zone B1 into the heat exchange zone Z1, and transferring the regenerated solvent to the top of said internal heat exchange zone; and
  e) recycling the regenerated solvent to the absorption zone C1.

26 Claims, 4 Drawing Sheets

METHOD OF SEPARATING A MIXTURE OF GASES BY ABSORPTION

This application is a continuation of application Ser. No. 07/925,699, filed Aug. 7, 1992 now abandoned.

The invention concerns a method of separating a mixture of gases by absorption.

BACKGROUND OF THE INVENTION

Absorption by a solvent circulating in a loop is a method which is commonly used when a constituent or a certain category of constituents has to be at least partially extracted from a stream of gas.

The method used generally comprises two stages, a stage of absorption proper, when the gas to be treated and the solvent are put into contact in reverse directions in a vertical column, then a stage of solvent regeneration, when the gas fraction absorbed during the first stage is desorbed by the action of heat or pressure or both. The solvent thus regenerated can then be recycled to the first stage.

In cases where the solvent temperature has to be raised in order to regenerate the solvent, it is essential to recover the heat applied, in order to obtain a good heat balance for the process. The means generally employed is described below, with reference to FIG. 1.

The solvent leaving the absorption column C1 through the pipe 4, after possible expansion in the valve V1, and the regenerated solvent leaving the regenerating column C2 through the pipe 8, via the pump P1 and pipe 9, pass into a heat exchange zone E1. On leaving that zone the charged solvent returns to the regenerating column C2 through the pipe 6 in a hot, partially vaporized state, thereby saving energy in the reboiler of the regenerating column. The cold regenerated solvent is passed to the absorption stage through the pipe 10, since absorption is generally encouraged at low temperature. The heat supplied to the reboiler of column C2 is thus partially recovered in the heat exchanger E1. However, this process causes irreversible heat losses, owing to the fact that the solvent vaporized in the heat exchanger E1 and the reboiler of column C2 has to be recondensed at the top of column C2 by a cold fluid external to the process.

SUMMARY OF THE INVENTION

It has been discovered—and this is one of the subjects of the invention—that the heat balance from regenerating an absorption solvent may be substantially improved when the solvent is regenerated in an apparatus such that (a) the energy supplied to the reboiler of the apparatus is recovered efficiently, and (b) the vaporized solvent is at least partly recondensed without involving a fluid external to the process.

The method of the invention for separating a gas mixture G1 is in general characterised in that it comprises the following stages:

a) a stage of absorption of a part G2 of the mixture G1 by a solvent L1 in an absorption zone C1;

b) expansion of the solvent L1, leading to partial vaporisation of the absorbed gases G2 and cooling of the solvent L1;

c) a stage of desorption of the gas fraction G2 in a desorption apparatus D1 comprising a reboiling zone B1 and an internal heat exchange zone Z1, wherein the solvent L1 from stage (b) circulates in countercurrent contact with the vapor phase, and simultaneously has countercurrent heat exchange with the solvent phase from the reboiling zone B1;

passing the regenerated solvent leaving the reboiling zone B1 into the heat exchange zone Z1, and transferring the regenerated solvent to the top of said internal heat exchange zone; and e) recycling the regenerated solvent to the absorption zone C1.

DESCRIPTION OF THE INVENTION

It has been discovered—and this is one of the main subjects of the invention—that the use of an internal heat exchange zone enables a substantial saving to be made in the amount of heat supplied to the reboiler.

The saving may be such that all the heat exchange between the charged solvent L1 emanating from the absorption stage (a) and the regenerated solvent L1 emanating from the desorption stage (c) takes place in the zone Z1.

It has also been discovered that the internal exchange zone enables the regenerated solvent to be cooled. The result is (a) that the solvent vaporized in the reboiler is at least partly recondensed, and (b) that there is a commensurate reduction in the refrigerating power which has to be supplied in order to cool the regenerated solvent to the desired temperature before it is reintroduced into the absorption zone C1.

The method of the invention is thus particularly well adapted to refrigerated absorption of volatile products, requiring sub-cooling of the regenerated solvent before it is reintroduced into the absorption column C1.

Yet it may equally be adapted to a process operating at room temperature or above, such as dehydration by washing with a glycol or deacidification by washing with an amine.

Figure 1:
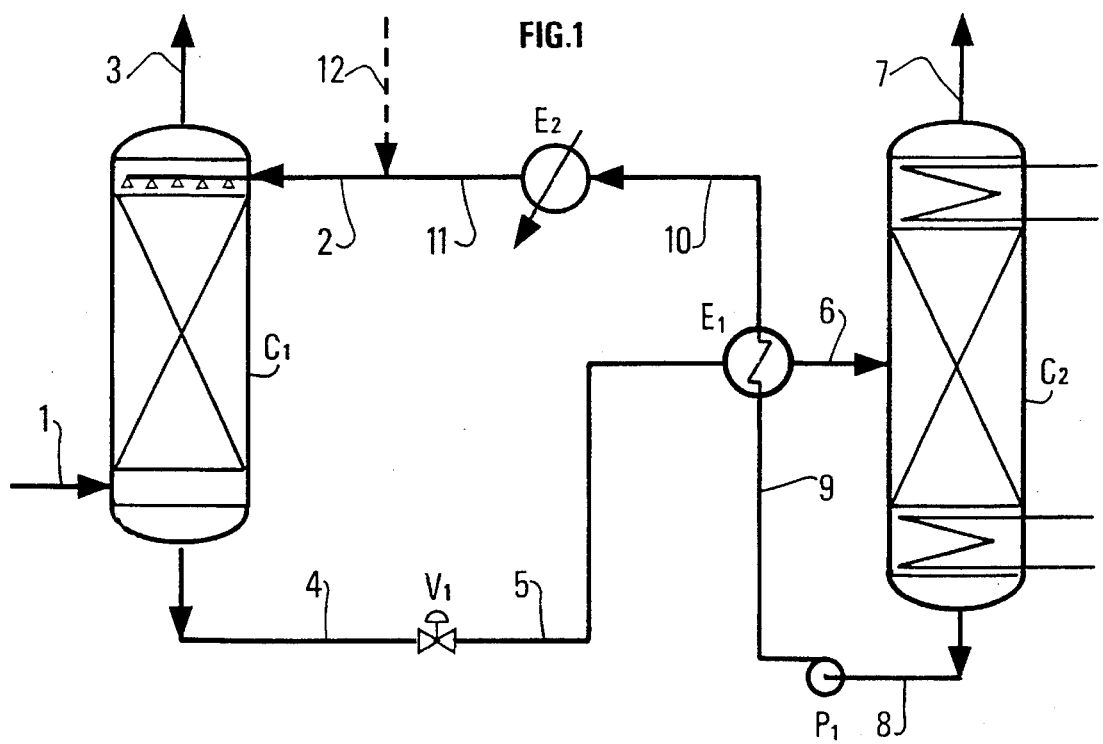
FIG. 1 is a diagram of the conventional process for regeneration of a solvent in an absorption and desorption of gases process.

The method of the invention is described in greater detail below with reference to FIG. 2.

The charge to be treated arrives through the pipe 1 in the absorption column C1 where it is put into contact, in reverse directions, with the regenerated solvent arriving through the pipe 2. The gas which has lost a fraction through absorption in the solvent leaves the column C1 through the pipe 3 and is discharged from the process. The solvent which absorbed that fraction leaves the column C1 through the pipe 4 and is expanded and partially vaporized in the valve V1. On leaving the valve it is passed through the pipe 5 to the desorption apparatus D1, which comprises a reboiling zone B1 and an internal heat exchange zone Z1.

The temperature in the reboiling zone B1 is generally from 70° to 220° C.

The temperature change undergone in zone Z1 by the solvent descending into the apparatus in contact with the steam, and the temperature change undergone by the solvent rising from the reboiler B1 into the zone Z1 are generally both more than 50° C.

The pressure in the desorption apparatus D1 is generally from 1 to 10 bar.

After rising into the internal heat exchanger Z1, the solvent leaves the desorption apparatus D1 and is passed to the exchanger E2 through the pipe 10.

In a special embodiment of the method of the invention, the exchange zone Z1 is formed by a vertical apparatus comprising means for countercurrent heat exchange between the solvent L1 and the solvent from the reboiling stage, and means for countercurrent contact between the solvent L1 and the vapor phase, and that the solvent L1 from stage (b) is passed to the top of the exchange zone Z1, and the solvent from the reboiling zone B1 is passed to the bottom of the exchange zone Z1.

It may further be advantageous for the height of the vertical apparatus forming the exchange zone Z1 to be sufficient to provide the equivalent of at least three theoretical levels of contact between the solvent L1 and the vapor phase.

The regenerated solvent is cooled to the desired temperature in the heat exchanger E2, removed through the pipe 11, mixed with the replenishing solvent arriving through the pipe 12, then passed to the absorption column C1 through the pipe 2.

The method of the invention may be carried out with both a physical solvent and a chemical solvent involving a reaction with the absorbate, or with a mixture including at least one physical and one chemical solvent.

The method of the invention may, for example, be applied to at least partial extraction of water, acid gases or the heaviest hydrocarbon fraction in a natural gas.

Figure 3:
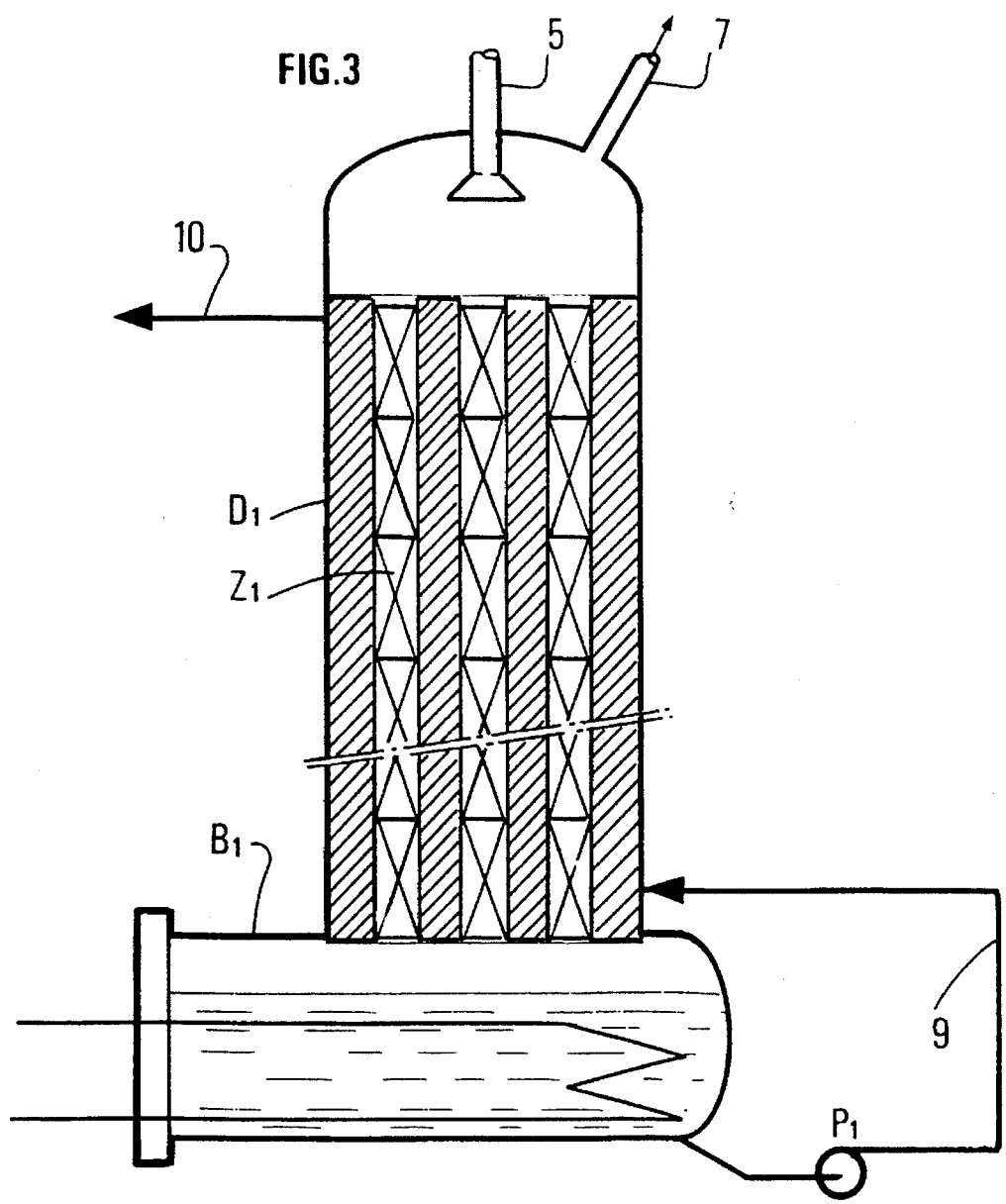
FIG. 3 is a diagram of the desorption apparatus used in the process of the claimed invention.

The desorption apparatus D1 is described below with reference to FIG. 3.

It chiefly comprises:

A reboiling zone B1, comprising a vessel of a capacity which enables a reboiling means known in the art to be immersed in the regenerated solvent, for example an electric heater, or a lance for circulating a heat-carrying fluid, or a fire tube; and A heat exchange zone Z1, located above the reboiling zone B1 and comprising two circulation spaces; such that the charged solvent, arriving at the top of the desorption apparatus D1 through the pipe 5, flows by gravity through one of the spaces, countercurrently to the vapor which rises from the reboiling zone B1 through said heat exchange zone Z1, the vapor then being discharged from the desorption apparatus D1 through the pipe 7; while the regenerated solvent which emerges from the reboiling zone B1 through the pipe 8, passing through the pump P1 and returning to the heat exchange zone Z1 through the pipe 9, flows upwardly through the other space then leaves the heat exchange zone Z1 through the pipe 10.

The internal heat exchange zone Z1 may have various configurations, some examples of which are explained below.

For example, the heat exchange zone Z1 may be made up of vertical tubes in which the solvent to be regenerated flows in a descending film over the inner walls of the tubes, while the regenerated solvent rising from the reboiling zone B1 flows outside the tubes in the jacket. The inner wall of the vertical tubes may be smooth, although it may equally have rough portions or have undergone a surface treatment to encourage mass transfer and heat transfer between the phases flowing inside the tubes and heat transfer between the phases flowing on either side of the wall. The internal surface of the tubes may, for example, have a geometry which encourages waves to appear in the film of descending liquid, or it may have corrugations along the axis of the tubes so as to increase their internal surface area, or it may be coated with a deposit of agglomerated solid particles which encourage nucleation of steam bubbles in the film of descending liquid.

The vertical tubes may equally be filled with bulk packing, such as spherical, annular or saddle-shaped pieces. The largest dimension of a packing element will preferably be less than one-eighth of the diameter of the tubes.

The vertical tubes may alternatively be filled with structured packing, e.g. in the form of metal gauze, knitted metal cloth, plates or spiders such as are used e.g. in static mixers.

Another possible configuration comprises having the contact between the solvent to be regenerated and the vapor rising from the reboiling zone B1 through the jacket on the external surface of the tubes, while the regenerated solvent rises from the reboiling zone B1 through the inside of the tubes. In this case the jacket may either be empty or filled with bulk or structured packing. In this case too, the external surface of the tubes may be smooth or have rough portions, or have undergone a surface treatment to encourage mass transfer and heat transfer between the phases flowing outside the tubes, and heat transfer between the phases flowing on either side of the wall.

Alternatively the heat exchange zone Z1 may have any structure known in the art. For example, the two circulation spaces may be formed respectively by coiled tubes and a jacket surrounding them; the circulation spaces may also be defined by a set of plates. The desorption apparatus D1 may also have a means for distributing the charged solvent in the corresponding circulation space of the heat exchange zone Z1 when this is a multiple space (e.g. made up of tubes). Such arrangements are known in the art.

Figure 2:
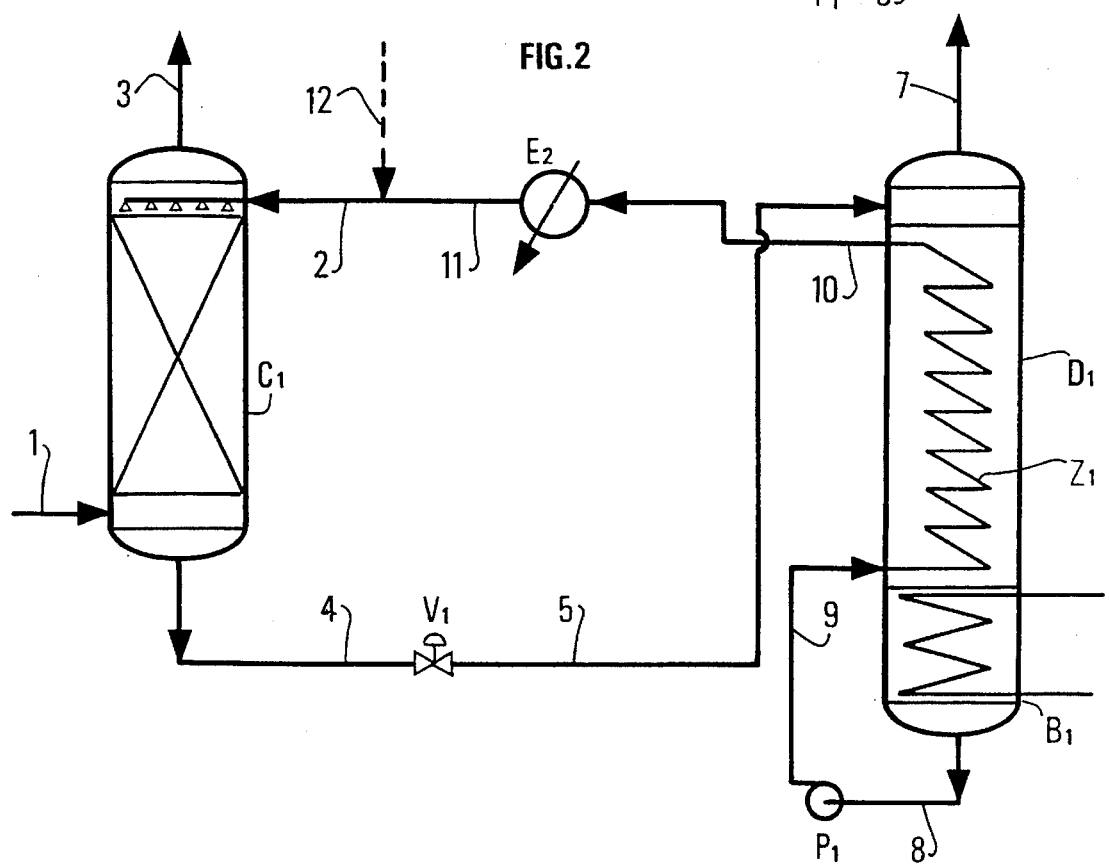
FIG. 2 is a diagram of a process according to the claimed invention.

The following two examples compare the arrangements illustrated in FIGS. 1 and 2. In both cases the gas to be treated (G1) is a light hydrocarbon gas ranging from methane to butane, from which the $C_3^+$ fraction (propane+n-butane) has to be extracted by a solvent (L1) which is an equimolar mixture of n-nonane and n-decane. The gas (G1) arrives in the absorption column C1 at a flow rate of 1 000 kg/h through the pipe 1, at a pressure of 5 bar and a temperature of −20° C. Its molar composition is as follows: methane 49.9%, ethane 29.3%, propane 15.5%, n-butane 5.3%.

EXAMPLE 1 (comparative)

In the classic absorption arrangement in FIG. 1, the regenerated solvent (L1) is injected at the top of the column C1 through the pipe 2 at a flow rate of 2 000 kg/h. The temperature of the solvent (L1) is −20° C., its pressure 5 bar. 57% of the propane and 98% of the n-butane contained in the incoming gas (G1) are absorbed by the solvent in the column C1. The depleted gas is discharged from the process through the pipe 3 at a temperature of −5° C., with a flow rate of 693 kg/h. The enriched solvent emerges from the bottom of the column C1 through the pipe 4 at a temperature of 2° C. and enters the expansion valve V1. It leaves the valve through the pipe 5 in a partially vaporized state, at a temperature of minus 5° C. and a pressure of 1.2 bar. The enriched solvent then returns to the heat exchanger E1, where it is heated by the regenerated solvent returning to the heat exchanger E1 through the pipe 9. The enriched solvent emerges from the exchanger E1 through the pipe 6 at a temperature of 110° C. and enters the regenerating column C2, which is a distillation column with plates or packing. The refrigerating power of the condenser of the column C2 is 44 kW, and the heating power of the reboiler is 78 kW. The light hydrocarbons which have been desorbed leave the column C2 and the process through the pipe 7 at a temperature of −20° C. The regenerated solvent leaves the column C2 through the pipe 8 at a temperature of 158° C. and enters the pump P1. It leaves the pump through the pipe 9 at a pressure of 5 bar and enters the heat exchanger E1. The solvent leaves the exchanger through the pipe 10 at a temperature of 5° C., before being cooled to −20° C. by a fluid external to the process in the exchanger E2, with a refrigerating power of 28 kW. It leaves the external fluid through the pipe 11, is mixed with the replenishing solvent arriving through the pipe 12 and is injected into the column C1 through the pipe 2.

EXAMPLE 2

In the arrangement according to the invention in FIG. 2, the regenerated solvent (L1) is injected at the top of the column C1 through the pipe 2 at a flow rate of 2 000 kg/h. The temperature of the solvent (L1) is −20° C., its pressure is 5 bar. 57% of the propane and 98% of the n-butane contained in the incoming gas (G1) are absorbed by the solvent in the column C1. The depleted gas is discharged from the process through the pipe 3 at a temperature of −5° C., with a flow rate of 692 kg/h. The enriched solvent emerges from the bottom of the column C1 through the pipe 4 at a temperature of 2° C. and enters the expansion valve V1. It leaves the valve through the pipe 5 in a partially vaporized state, at a temperature of minus 5° C. and a pressure of 1.2 bar. The enriched solvent is then injected into the desorption apparatus D1, which is a heat exchanger/column including an internal heat exchange zone and a reboiling zone. The heating power of the reboiler of the apparatus D1 is 50 kW. The light hydrocarbons which are desorbed leave the apparatus D1 and the process through the pipe 7 at a temperature of 9° C. The regenerated solvent leaves the reboiling zone of the apparatus D1 through the pipe 8 at a temperature of 161° C. and enters the pump P1. It is pumped out through the pipe 9 at a pressure of 5 bar, is passed into the internal heat exchange zone of the apparatus D1, and leaves it through the pipe 10 at a temperature of 15° C. From there the regenerated solvent flows into the heat exchanger E2, where it is cooled to minus 20° C. by a fluid external to the process. The refrigerating power of the heat exchanger E2 is 39 kW. The regenerated solvent leaves the heat exchanger E2 through the pipe 11, is mixed with the replenishing solvent arriving through the pipe 12, and is injected into the column C1 through the pipe 2.

If the arrangements in Examples 1 and 2 are compared it will be noted that recovery of the heavy $C_3^+$ fraction is identical in both cases. On the other hand the heating and refrigerating power required is respectively 36% and 46% less in the case of the FIG. 2 arrangement.

The last example shows how the method of the invention can be applied to separating methane from hydrocarbons of higher molar mass.

Another example of its application concerns the removal of acid gases, $CO_2$ and $H_2S$, from a natural gas. If, for example, an acid gas has to be removed at least partially from a natural gas, it is possible to operate with the basic arrangement shown in FIG. 2, putting the natural gas into contact with a refrigerating solvent, e.g. a solvent based on methanol. The solvent may contain a variable proportion of water, e.g. from 1 to 20% by weight, in order to limit coabsorption of hydrocarbons. The solvent containing acid gases which comes out of the column C1 is passed into the regenerating apparatus D1. The acid gas emerges from the top of the apparatus D1, and the regenerated solvent emerges, via the reboiling zone B1, at the top of the internal heat exchange zone Z1.

Figure 4:
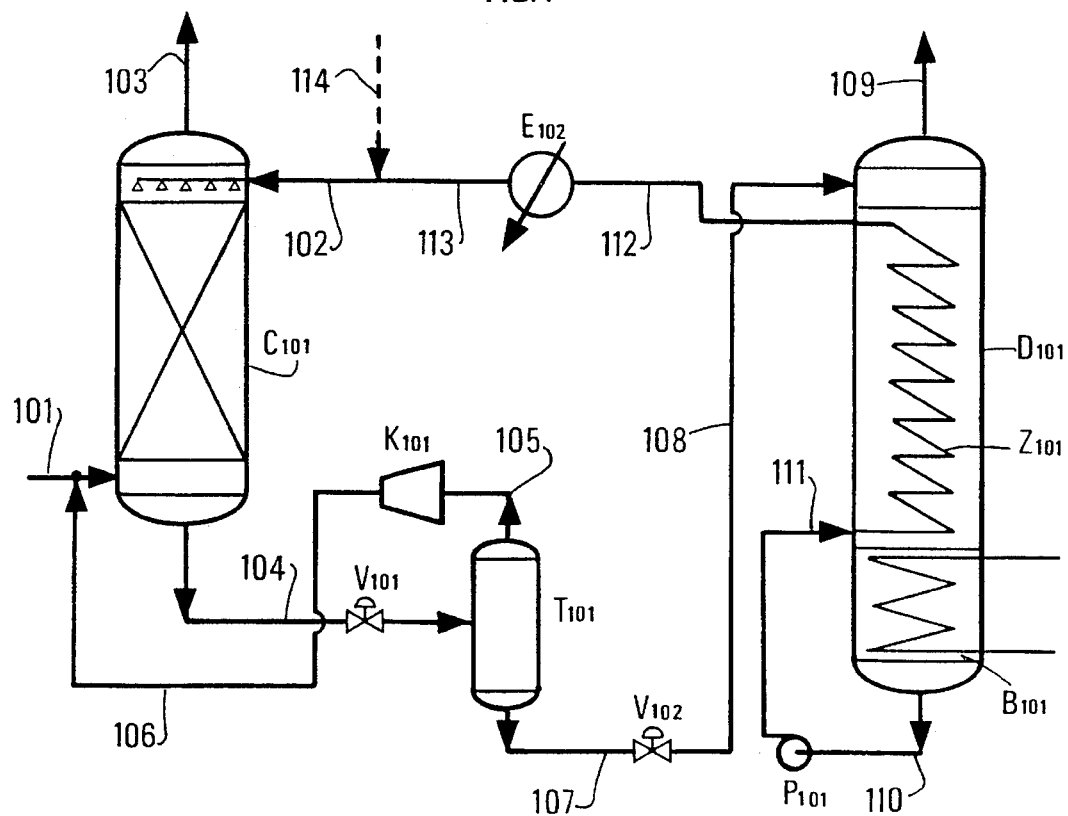
FIG. 4 is a diagram of a further embodiment of the process according to the claimed invention.

In order to limit losses of co-absorbed hydrocarbons, it is also possible to operate with the basic arrangement illustrated in FIG. 4. In Example 3 the gas to be treated (G1) is methane containing 2 000 ppm mol of $H_2S$. The extraction solvent (L1) is made up of methanol and water, the proportion of water being 20% by weight. The gas (G1) comes into the process through the pipe 101 at a flow rate of 1608 kg/h, at a pressure of 30 bar and a temperature of −30° C.

EXAMPLE 3

In the FIG. 4 arrangement, the regenerated solvent (L1) in injected into the top of the column C101 at a flow rate of 3 684 kg/h. The temperature of the solvent (L1) is −30° C., its pressure is 30 bar. The gas to be treated arrives through the pipe 101, is mixed with the fraction (G2) leaving the compressor K101 through the pipe 106, then is injected into the column C101. The depleted gas is discharged from the process through the pipe 103 at a temperature of −31° C., with a flow rate of 1 576 kg/h. Its content of $H_2S$ is 4 ppm mol. The enriched solvent comes out of the bottom of the column C101 through the pipe 104 at a temperature of −30° C. It contains 26 kg/h of methane and 7 kg/h of $H_2S$, for a total output of 3 716 kg/h.

The enriched solvent passes through the pipe 104 into the valve V101, in which it is expanded and partly vaporized, then enters the vessel (ballon) T101 at a temperature of −32° C. and a pressure of 6 bar.

The gas fraction emanating from partial vaporisation of the enriched solvent leaves the vessel T101 through the pipe 105 and enters the compressor K101, from which it emerges through the pipe 106 at a temperature of 110° C. and a pressure of 30 bar.

This fraction is mixed with the gas to be treated (G1), which comes into the process through the pipe 101, and is then let into the column C101.

The liquid fraction (L2), emanating from partial vaporization of the enriched solvent, leaves the vessel T101 through the pipe 107 and passes into the valve V102.

It emerges from the valve through the pipe 108, partially vaporized, at a temperature of −32° C. and a pressure of 3 bar. The fraction (L2) contains 5.6 kg/h of methane and 6.8 kg/h of $H_2S$, for a total output of 3 696 kg/h.

The liquid fraction (L2) passes through the pipe 108 into the desorption apparatus D101, which is a heat exchanger/column including an internal heat exchange zone Z101 and a reboiling zone B101. The heating power of the reboiler B101 is 40 kW. The $H_2S$ and methane which are desorbed leave the apparatus D101 and the process through the pipe 109 at a temperature of −25° C.

The regenerated solvent leaves the reboiling zone B101 through the pipe 110 at a temperature of 101° C. and enters the pump P101. It is pumped out through the pipe 111 at a pressure of 30 bar, passed into the heat exchange zone Z101 and leaves that zone through the pipe 112 at −15° C. The regenerated solvent contains 0.016 kg/h of $H_2S$.

The regenerated solvent passes through the pipe 112 into the heat exchanger E102, where it is cooled to a temperature of −30° C. by a fluid external to the process. It leaves the exchanger E102 through the pipe 113 and is then mixed with the replenishing solvent arriving through the pipe 114 and is let into the column C101 through the pipe 102. The refrigerating power of the exchanger E102 is 42 kW.

Figure 5:
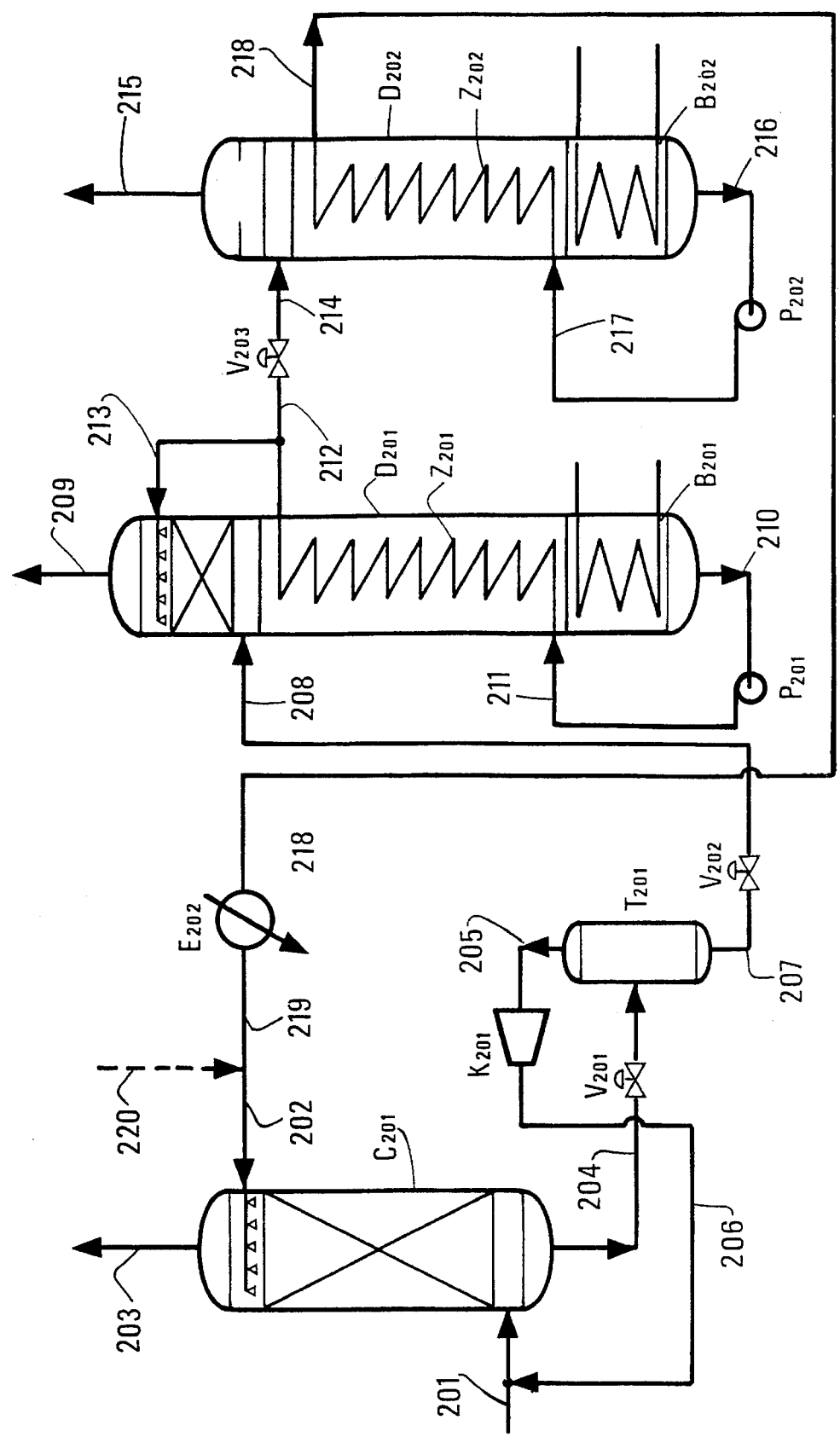
FIG. 5 is a diagram of a still further embodiment of the process according to the claimed invention.

In cases where two acid gases of different volatility, e.g. $CO_2$ and $H_2S$, have to be removed from a gaseous mixture, and where the two gases have to be discharged in different pipes, it is possible to use the arrangement illustrated in FIG. 5, as described below.

The charge to be treated comes into the process through the pipe 201, is mixed with the gas fraction arriving from the compressor K201 through the pipe 206, and is let into the column C201. Here it is put into contact, in reverse directions, with the regenerated solvent arriving through the pipe 202. The deacidified gas leaves the column C201 through the pipe 203 and is discharged from the process. The enriched solvent leaves the column through the pipe 204, enters the valve V201 where it is expanded and partially vaporized, then passes into the vessel T201.

The gas fraction emanating from the expansion leaves the vessel T201 through the pipe 205 and enters the compressor K201, where it is returned to the operating pressure of the column C201. It leaves the compressor K201 through the pipe 206, is mixed with the charge to be treated, arriving in the process through the pipe 201, and enters the column C201.

The liquid fraction, emanating from the expansion of the enriched solvent in the valve V201, leaves the vessel T201 through the pipe 207, enters the valve V202 where it may be expanded, then enters the desorption apparatus D201, which includes a reboiling zone B201 and an internal heat exchange zone Z201.

The partially regenerated solvent leaves the reboiler B201 through the pipe 210, enters the pump P201, is pumped out through the pipe 211, passes into the heat exchange zone Z201 and leaves it through the pipe 212. Part of the partially regenerated solvent may be reinjected into the top of the apparatus D201, to wash the gas fraction which leaves the apparatus D201 and the process through the pipe 209; this fraction contains the majority of the most volatile acid gas. The other part of the partially regenerated solvent leaving the heat exchange zone Z201 is expanded in the valve V203. It passes out of the valve through the pipe 214 and enters the desorption apparatus D202, comprising a reboiling zone B202 and an internal heat exchange zone Z202.

The least volatile acid gas leaves the apparatus D202 through the pipe 215 and is discharged from the process. The regenerated solvent leaves the reboiling zone B202 through the pipe 216, enters the pump 202, leaves it through the pipe 217 and enters the heat exchange zone Z202. It passes out of the apparatus D202 through the pipe 218, is cooled in the exchanger E202 by a fluid external to the process, leaves the exchanger E202 through the pipe 219, is mixed with the replenishing solvent arriving through the pipe 220 and passes into the column C201 through the pipe 202.

These examples do not restrict the scope of the invention. As already indicated, the method may be applied to the removal of water, using e.g. diethylene glycol or triethylene glycol as solvent, or to the removal of acid gases, using e.g. diethanolamine as solvent. It may equally be used on a refinery gas or any other synthesized gas to remove water, acid gases or paraffinic, olefinic or aromatic hydrocarbons, either selectively or non-selectively.

We claim:

1. A method of separating a mixture of gases which comprises:
   a) absorbing a gas fraction from the mixture of gases with a solvent in an absorption zone and obtaining a resultant charged solvent;
   b) expanding the charged solvent from step a) in an expansion means to vaporize a portion of the absorbed gases and cool the solvent;
   c) passing the cooled solvent and vaporized absorbed gases from step b) into a desorption column comprising a reboiling zone heated by an external heat source and a desorbing zone, extending from above the reboiling zone along substantially the whole height of the desorption column, incorporating an internal heat exchange zone, said internal heat exchange zone extending along substantially the whole height of the desorbing zone and being above and distinct from the reboiling zone, countercurrently contacting in the desorption column the solvent from step b) with a gas fraction desorbed from the solvent and collecting a regenerated solvent from the reboiling zone;
   d) passing the regenerated solvent from the reboiling zone of the desorption column into and through the internal heat exchange zone of the desorption column and subjecting the solvent in the absorbing zone of step c) to indirect countercurrent heat exchange with the regenerated solvent; and
   e) recycling the regenerated solvent from the internal heat exchange zone to the absorption zone of step a).

2. The method of claim 1, wherein: the regenerated solvent emerging from the internal heat exchange zone is cooled, before being recycled to the absorption zone.

3. The method of claim 1, wherein the solvent is a physical solvent.

4. The method of claim 1, wherein the solvent is a chemical solvent.

5. The method of claim 1, wherein the solvent L1 is a mixture of at least one physical and at least one chemical solvent.

6. The method of claim 1, wherein the mixture of gases is a natural gas.

7. The method of claim 6 wherein the natural gas contains two or more hydrocarbon fractions and at least part of the heaviest hydrocarbon fraction contained in the mixture of gases is extracted from the mixture of gases by the method.

8. The method of claim 6, wherein the natural gas contains acid gases and at least part of said acid gases contained in the mixture are extracted from the mixture of gases by the method.

9. The method of claim 6, wherein the natural gas contains water and at least part of the water is extracted from the mixture of gases by the method.

10. The method of claim 1, wherein during the heat exchange which is carried out countercurrently in the internal heat exchange zone, the temperature change undergone by the solvent from the expansion means and that undergone by the solvent from the reboiling zone is more than 50° C.

11. The method of claim 1 wherein the desorbing zone comprises a vertical apparatus, comprising means for indirect countercurrent heat exchange between the solvent from the expansion means and the solvent from the reboiling zone, and means for countercurrent contact between the solvent from the expansion means and the gas fraction desorbed from the solvent and wherein the solvent from the expansion means is passed to the top of the desorbing zone, and the solvent from the reboiling zone is passed to the bottom of the desorbing zone.

12. The method of claim 11, wherein the height of the vertical apparatus in the desorbing zone provides the equivalent of at least three theoretical contact levels between the solvent from the expansion means and the gas fraction desorbed from the solvent.

13. The method of claim 1, wherein all the heat exchange between the charge solvent leaving the absorption zone (a) and the regenerated solvent leaving the absorption apparatus (c) takes place in the internal heat exchange zone.

14. The method of claim 1, wherein the internal heat exchange zone is made up of vertical tubes and a jacket surrounding said tubes.

15. The method of claim 14, wherein contact between the solvent from the expansion means to be regenerated and the gas fraction desorbed from the solvent rising from the reboiling zone takes place inside the tubes, whereas the regenerated solvent from the reboiling zone rises through the jacket outside the tubes.

16. The method of claim 15, wherein the internal surface of the tubes has rough portions, or has undergone a surface treatment to encourage mass transfer and heat transfer.

17. The method of claim 15, wherein the vertical tubes are filled with bulk packing.

18. The method of claim 17, wherein the largest dimension of the packing elements is smaller than one-eighth of the diameter of the vertical tubes.

19. The method of claim 15, wherein the vertical tubes are filled with structured packing.

20. The method of claim 15, wherein the solvent from the expansion means to be regenerated flows in a descending film in the tubes.

21. The method of claim 14, wherein contact in the desorbing zone between the solvent from the expansion means being regenerated and the gas fraction desorbed from the solvent rising from the reboiling zone takes place in the jacket, whereas the regenerated solvent from the reboiling zone rises inside the tubes.

22. The method of claim 21, wherein the external surface of the tubes has rough portions, or has undergone a surface treatment to encourage mass transfer and heat transfer.

23. The method of claim 21, wherein the jacket is filled with bulk packing.

24. The method of claim 21, wherein the jacket is filled with structured packing.

25. The method of claims 1, wherein the internal heat exchange zone is made up of coiled tubes and a jacket surrounding said tubes.

26. The process of claim 2, wherein: the solvent emerging from the internal heat exchange zone is cooled to a temperature of 0°–50° C.

* * * * *